July 29, 1969

A. M. TRIPP 3,457,667

ANIMATED FISH LURE

Filed April 8, 1968

INVENTOR

ARTHUR M. TRIPP

BY *Birch + Birch*

ATTORNEY

3,457,667
ANIMATED FISH LURE
Arthur Mendell Tripp, 101 Turner Road,
Oak Ridge, Tenn. 37830
Filed Apr. 8, 1968, Ser. No. 719,504
Int. Cl. A01k 85/00, 85/06
U.S. Cl. 43—42.02                                     5 Claims

ABSTRACT OF THE DISCLOSURE

A fish lure having line activated components in the form of wings or with fish hooks carried thereby and a water resistant convex nose portion to control depth, the line being connected through an opening and fair lead means to a coil spring biased drum having a line wrapped section to revolve the drum against the winding action of the spring and through crank arms driven by the drum cause movements of the components to simulate the movement of a winged insect.

---

This invention relates to fish lures and more particularly to animated lures formed of line activated components mounted in the plug body of the lure and projecting therefrom at locations to simulate wings or the like.

An object of the invention is to provide a lure body having lateral hook holders movably connected to crank means at each medial side portion of the body and having a line winding drum with a spring windable by a turn imparted to the drum when the line is pulled.

With the above, and other objects in view, which will become apparent as the invention is fully understood, the same resides in the novelty of construction, combination and arrangement of elements hereinafter described in detail and distinctly claimed in the appended claims.

The description is intended to be read in conjunction with the accompanying drawing, wherein like reference characters refer to like parts through the several views, wherein.

Figure 2:
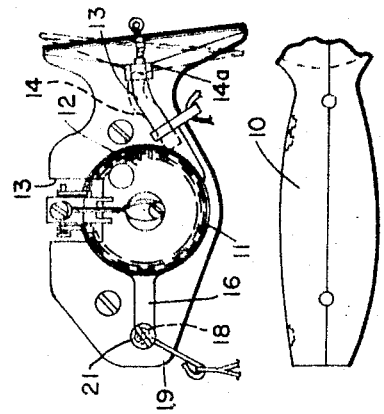
FIGURE 2 is a side elevation of one half section of the plug or lure body showing the parts assembled in position within the body.
Figure 3:
FIGURE 3 shows the lure sections secured together.

Referring to the drawing and first with reference to FIGURES 2 and 3, there is provided a plug or body 10 formed of two mating half sections. In the plug 10 are mounted the components of the fish lure, said components being connected to a circular frame 11.

Figure 1:
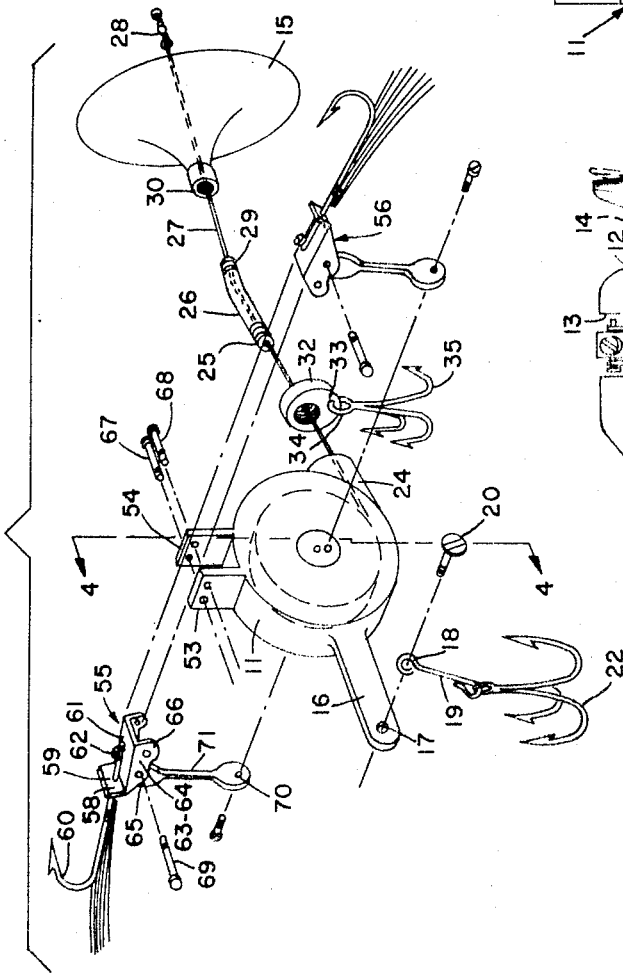
FIGURE 1 is a view of the parts pulled apart in perspective and removed from the lure body or plug.

The body or plug 10 has a nose and tail portion and is formed with a middle recess 12, intermediate side notched recess means 13, an elongated curved channel 14 extending from the recess 12 to an opening 14a in the nose concentric with the apex of a convex disc 15 with the re-entrant side exterior of the nose portion. The tail of the plug 10 is recessed to receive a hook arm 16 formed from the frame 11. This arm 16 is formed with an aperture 17 to provide for connecting the arm with the eyelet 18 of a fish hook coupling link 19. The link is secured by a bolt 20 adapted to thread into a threaded socket 21 in the lure body. The hook link 19 in turn couples to the eyelet portion of a suitable fish hook 22, such as the triple hook shown in FIGURES 1 and 2.

Formed from the lower peripheral portion of the frame 11 is an enlargement 24 with a threaded bore. The bore of this enlargement is formed with complementary threads to mate with the exteriorly threaded end 25 of a fair lead tube 26. This tube is a line guide for the line or leader 27 extending from a well-known line swivel 28 which is connected to a suitable main fish line, not shown. The tube 26 is also threaded at opposite end 29 to engage in the threaded nipple 30 of the depth control disc 15 carried at the nose portion of body 10.

Around the tube 26 is suitably secured a hook holding washer 32. This washer 32 is formed with a hook eyelet coupling aperture 33 for receiving the eyelet 34 of a suitable type of fish hook 35.

Figure 4:
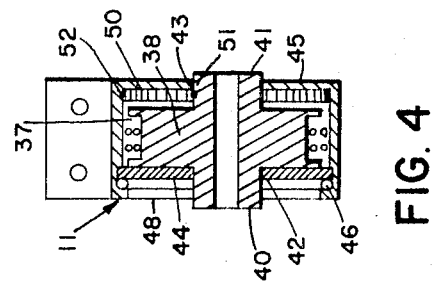
FIGURE 4 is a section view taken on section line 4—4 of FIGURE 1 to show the frame and drum mounted therein with its related retaining members and the spring means operatively associated therewith.

When the fairlead tube, hook and washer and depth disc assembly are coupled together, the line 27 leads therethrough to a line wrapping area or portion 37 of a drum 38, see FIGURE 4. The drum is formed with suitable bearing means, such as diametrically projecting trunnions or hubs 40 and 41, which are rotatably mounted or journalled in spaced oppositely positioned openings 42 and 43 in the thrust washer 44 and wall 45 of the frame 11.

The thrust washer 44 is held in the frame 11 by a split retainer ring 46, which snap fits into annular groove formed around the interior of the frame inwardly of an annulus or flange 48. This arrangement serves to retain the drum 38 and a coil spring 50 within the frame 11, see FIGURE 4.

The spring 50 is similar to a clock spring having flat spring convolutions wound on themselves in superimposed relation and has the end of the inner coil secured by set screw 51 to the drum 38 at hub 41, while the outer coil is suitably secured to the interior of the frame 11 by a set screw or the like 52 to permit winding and unwinding action of the spring 50 in response to pull on the line 27 wrapped partially around section 37 of the drum. A more complete explanation of this action will follow under the description relating to use and operation.

The frame 11 includes peripherally spaced transverse lugs 53 and 54 adapted to pivotally mount oppositely projecting hook arms 55 and 56. Each arm is identical in form. Thus a description of the arm 55 will suffice for both, said arms being of a sheet metal or plastic having an upturned front tab 58 with an opening 59 to receive the shank of a camouflaged fish hook 60 and a flat land or surface 61 with a threaded socket to receive a bolt engageable through the eyelet of the hook. Along each longitudinal side of the member are flange means 63 and 64 each formed with fore and aft apertured transversely spaced scollop sections 65 and 66. Each section receives mounting pivot pins 67 and 68 for insertion in the mounting lug apertures 53 and 54 and a pivot pin 69 for connection with one of the eyelets 70 of a crank link 71. The lower eyelet of the link 71 connects to the hub 40 by a bolt engaged in an eccentrically positioned threaded socket formed in the hub, as shown by the broken assembly line in FIGURE 1. This construction of the link 70 and connection to the drum hub 41 is identical to the connections to hub 40. Thus, when the hubs 40 and 41 turn the respective crank links 71 cause the respective camouflaged hooks 60 and the arms 55 and 56 at each side to provide a flap motion in simulation of wings.

Use and operation

For the use and operation of the fish lure, a main line is suitably attached to the swivel connector 28 and the lure cast into the water. Then the lure is activated by tautening and slacking the line so the wrapped portion of the leader 27 on the drum section 37 is partially unwound by the pull on the fishing line. This turns the drum 38 and partially winds the spring 50, until the pull on the line is stopped to provide a slack line, whereupon the spring 50 unwinds to its original position and turns the drum 38 in reverse direction.

Each taut and slack line condition as it turns the drum 38 imparts a crank action to the links 71 and to the hook arms 55 and 56, thereby flapping the hook arms and their respective camouflaged hooks 60 in the manner of wings.

Further, as the lure is pulled forward by the pull on the line, the depth control disc 15 will wobble and cause a wiggle action in the path of travel of the lure. For example, during a pull on the line the water pressure at the lower edge of the disc causes the disc to resist forward motion and the lure tends to nose downward until the release of the line to a slack condition will change the water resistance at the lower portion of the disc 15 and permit the nose to direct upward in the water.

Thus, there is provided a novel and simply constructed animated fish lure having flapping wing-like movement in conjunction with an up and down or wiggling action.

Without further description it is believed that the advantages of the present invention over the prior art is apparent and while only one embodiment of the same is illustrated, it is to be expressly understood that the invention is not limited thereto as various changes may be made in the combination and arrangement of the parts illustrated, as will now likely appear to others and those skilled in the art.

What is claimed is:

1. A fish lure with a body having a nose and a tail portion, water depth control means having a re-entrant water receiving portion mounted in the nose portion, said means being formed with a central opening for a fishing line leader; a fair lead extending from the opening in said means to the interior of said body, a turnable drum with bearing means journalled in said body, a frame supporting said drum bearing means, spring means coiled in stacked convolutions in said recess having the outer convolution thereof secured to the frame and the inner convolution thereof secured to one of said drum bearing means, a central line winding section formed in said drum arranged to wind and unwind a fish line wrapped on the drum in response to tautening and slackening of the line, and crank levers eccentrically connected to each of said drum bearing means at one end and pivoted to lateral lever arms extending from each side of the body pivot means for said arms, said arms having fish hook and hook coupling means at each free end thereof and having flapping movement imparted thereto from said crank levers as the drum is oscillated.

2. A fish lure as described in claim 1, wherein said water depth control means is a conical disc having the re-entrant face thereof exterior of the nose of the lure to variably resist pull through water.

3. A fish lure as described in claim 1, wherein the fairlead is a tubular section so formed and so proportioned as to receive and position the fish line within the body of the lure for connection to the line engaged portion of the drum.

4. A fish lure as described in claim 1, wherein said frame housing the drum includes rearwardly projecting hook arm means and wherein said pivot means comprise laterally projecting spaced lugs and transverse pivot pins between which each of said lateral hook holding arms are pivoted.

5. A fish lure as described in claim 1, wherein each of said fish hooks are camouflaged by hook concealing means secured thereto.

References Cited

UNITED STATES PATENTS

| 726,021 | 4/1903 | Bryan | 43—26.2 |
| 1,393,617 | 10/1921 | Frame | 43—26.2 |
| 1,857,312 | 5/1932 | Kuehn | 43—42.02 |
| 2,724,205 | 11/1955 | Howard | 43—42.02 X |
| 2,813,365 | 11/1957 | Cross | 43—26.2 |

WARNER H. CAMP, Primary Examiner

U.S. Cl. X.R.

43—26.2